United States Patent

Corona

[11] Patent Number: 5,191,353
[45] Date of Patent: Mar. 2, 1993

[54] THERMAL CONTROL MECHANISM FOR MULTIPLE PRINT BAR SYSTEM

[75] Inventor: Stephen C. Corona, Rochester, N.Y.

[73] Assignee: Xerox Corporation, Stamford, Conn.

[21] Appl. No.: 814,528

[22] Filed: Dec. 30, 1991

[51] Int. Cl.$^5$ .................... G01D 9/00; G01D 9/42; H04N 1/23
[52] U.S. Cl. .................... 346/1.1; 346/107 R; 358/302; 165/61; 400/719
[58] Field of Search ............ 346/107 R, 1.1, 76 PH; 358/302; 400/719, 124 TC; 361/384; 165/14, 16, 138, 146, 61, 22

[56] References Cited

U.S. PATENT DOCUMENTS

| | | | |
|---|---|---|---|
| 4,601,328 | 7/1986 | Tasaka et al. | 165/12 |
| 4,660,059 | 4/1987 | O'Brien | 346/157 |
| 4,679,615 | 7/1987 | Livne | 165/146 X |
| 4,704,620 | 11/1987 | Ichihashi et al. | 165/61 X |
| 4,865,123 | 9/1989 | Kawashima et al. | 165/104.33 |
| 4,884,079 | 11/1989 | Inoue et al. | 346/1.1 |

FOREIGN PATENT DOCUMENTS

| | | | |
|---|---|---|---|
| 0185094 | 9/1985 | Japan | 165/146 |
| 0055180 | 3/1987 | Japan | 400/719 |

Primary Examiner—Benjamin R. Fuller
Assistant Examiner—David Yockey

[57] ABSTRACT

The temperature of LED print bars utilized in a printing system are maintained within a specified differential range, with respect to each other. Each print bar has an associated heating and cooling element. The temperature of each print bar is monitored and compared during operation. When a temperature differential greater than a preset tolerance range is detected, either the hotter operating print bar is cooled or the lower operating print bar is heated, or a combination of cooling and heating is applied to the out-of-tolerance print bars. The cooling and/or heating of the print bars is continued until the temperature differential is reduced so as to be within the preselected or predefined range.

7 Claims, 2 Drawing Sheets

THERMAL CONTROL MECHANISM FOR MULTIPLE PRINT BAR SYSTEM

BACKGROUND AND MATERIAL DISCLOSURE STATEMENT

The present invention is related to printing systems incorporating light emitting print bars as the imager, and, more particularly, to a print system using LED print bars whose operational temperatures are maintained within a given tolerance range.

Image print bars used in xerographic recording systems are well known in the art. The print bar generally includes a linear array of a plurality of discrete light emitting sources on a substrate. The print bar is optically coupled to a linear lens array. Light emitting diode (LED) print bars are preferred for many recording applications. In order to achieve high resolution, a large number of light emitting diodes, or pixels, are arranged in a print bar and means are included for providing a relative movement between the print bar and the photoreceptor so as to produce a scanning movement of the print bar over the surface of the photoreceptor. Thus, the photoreceptor may be exposed to provide a desired image one line at a time as the LED print bar and associated lens array is advanced relative to the photoreceptor either continuously or in stepping motion. Each LED pixel in the print bar is used to expose a corresponding area on the photoreceptor to a value determined by image defining video data information.

In a color xerographic system, a plurality of LED print bars may be positioned adjacent the photoreceptor surface and selectively energized to create successive image exposures, one for each of the three basic colors. A fourth print bar may be added if black images are to be created as well.

FIG. 1 shows a prior art single pass color configuration having three print bars, 10, 12, 14. The print bars, each comprising an LED array and a coupling gradient index lens array (10A, 10B, 12A, 12B, 14A, 14B, respectively), are addressed by video image signals whose application is controlled by control circuit 15. Each print bar is optically coupled to focus the emitter outputs to form three spaced latent images $l_1$, $l_2$, $l_3$ on the surface of photoreceptor belt 16. The optical coupling is accomplished by the gradient index lens arrays 10B, 12B, 14B, the lens array sold under the name SELFOC $_{TM}$ a trademark of Nippon Sheet Glass Co., Ltd. Upstream of each exposure station, a charge device 18, 20, 22 places a predetermined charge on the surface of belt 16. Downstream from each exposure station, a development system 26, 28, 30, develops a latent image of the last exposure without disturbing previously developed images. Further details of xerographic stations in a multiple exposure single pass system are disclosed in U.S. Pat. No. 4,660,059 whose contents are hereby incorporated by reference.

With such a system as that disclosed in FIG. 1, each colored image must be precisely aligned such that all corresponding pixels in the image areas are registered. The print bar alignment requirements are that pixels of each bar be aligned in the scan or Y-direction of FIG. 1 so that each active write length is equal. The print bar must also be aligned in the skew or X-direction. This alignment must be maintained through continous revolutions (passes) of the photoreceptor.

To maintain exact color registration of each image, typically to a tolerance of $\pm 0.1\mu$, the overall length of the write area, the pixel to pixel placement, and the straightness of the image line must all be within the required exacting tolerance. One of the most difficult manufacturing tolerances to achieve is the overall or active write length of an image print bar. For example, for a 14.33″ LED print bar with 300 spi resolution, 4299 pixels are aligned in the active write area and a $\pm 15\mu$ tolerance in write length is typical.

A specific problem in correcting exact image-to-image registration, and one which is addressed by the present invention, is the change in length an LED print bar undergoes when subjected to temperature increases (thermal expansion), which are caused either by heat generated internally to the print bar, or by heat absorbed by the print bar from the surrounding machine environment.

Typically, accurate LED print bars are formed on a single ceramic substrate with a CET (coefficient of thermal expansion) on the order of $7.0 \times 10^{-6}$ linear units /°C. To achieve proper registration (for a $\pm 10\mu$ tolerance due to thermal effects) of all pixels over a 364 mm write zone (B4 paper size), the temperature of all multiple print bars would have to be held to $\pm 3.9°$ C. An additional factor which must be considered is the need to compensate for the decrease in conversion efficiency of electrical to optical energy. For example, GaAsP LED material illumination efficiency decreases approximately 0.8% per °C.

According to the principles of the present invention, a thermal controller system is provided which maintains multiple print bar temperatures within specific required limits. The temperature of each print bar is sensed and representative signals sent to a machine thermal controller to provde individual heating or cooling to maintain the print bar temperatures within a given tolerance as required for a dot-to-dot placement accuracy. More particularly, the invention is directed towards a thermal control system for maintaining the relative temperature of multiple print bars within a specified temperature differential range comprising:

a heater connected to each print bar and adapted, when energized, to increase the print bar temperature, a temperature sensor associated with each print bar adapted to continually sense the operating temperature of the associated print bar and to generate an output signal representative thereof, a cooling mechanism operatively coupled to each print bar to provide a cooling medium to one end of the print bar, and adapted, when energized, to decrease the temperature of the associated print bar, system control means for selectively controlling the temperatures of each of the print bars, said temperatures represented by signals from the associated temperatures sensor, and for detecting a predetermined temperature differential between two or more print bars, said control means further adapted to control the operation of said heaters and cooling mechanisms to restore the sensed temperature differential to within the specified differential range.

The following references have been identified in a prior art search:

U.S. Pat. No. 4,865,123 to Kawashima et al. discloses an apparatus for circulating a cooling fluid through a plurality of cooling modules for cooling electronic components. The apparatus includes a plurality of supply lines arranged independently and in parallel to each other. Each of the supply lines supplies coolant to an individual cooling module. At one end, the supply lines draw coolant from a mixing tank having a relatively large volume, and at the opposite end, the supply lines return the coolant to the mixing tank, wherein the coolant is circulated so that its temperature is kept uniform throughout. Each supply line includes a pair of pumps 3, check valves 4, and a heat exchanger 5.

U.S. Pat. No. 4,601,328 to Tasaka et al. discloses a method for temperature balancing control of a plurality of heat exchangers used in parallel. The temperatures of a medium flowing through the parallel heat exchangers are sensed at the same position in each of the plurality of heat exchangers, and the sensed temperature values are respectively compared with a temperature setting value, so as to calculate control signals for balancing the temperatures of the medium flowing out of the heat exchangers. Regulation means for each of the respective heat exchangers are responsive to the control signals to effect temperature balance of the medium.

In addition, co-pending application Ser. No. 07/773,793, filed on Oct. 9, 1991, and assigned to the same assignee as the present invention, discloses a method and apparatus for maintaining print bars at the same temperature by circulating a cooling medium through each print bar assembly.

DESCRIPTION OF THE INVENTION

Referring again to FIG. 1, it is assumed that LED print bars 10, 12, 14 have a resolution of 300 spots per inch (300 spi), and a pixel size of 50 ×50 microns on 84.67 micron centers. In an application, where an 8.5 inch wide informational line (active write length) is to be exposed, a linear LED print bar of approximately 2550 pixels, arrayed in a single row, would be required.

It is assumed that the print bars will be operated in an environment where temperature increase will be experienced that would change (increase) the active write length of one or more of the LED bars 10, 12, 14. For example, the print bars may be located within a xerographic machine frame which, because of other thermal loads, will experience an internal temperature rise ($\Delta T$). The actual rise will depend on the system and its specific operating parameters. Based on observations of present systems, an internal temperature rise of approximately 20° C. can be expected. In addition, room ambient temperature difference adds another 14° C. of $\Delta T$ to the temperature tolerance stackup. Print bar to print bar average operating power differences also add an additional complexity to the system.

Figure 1:
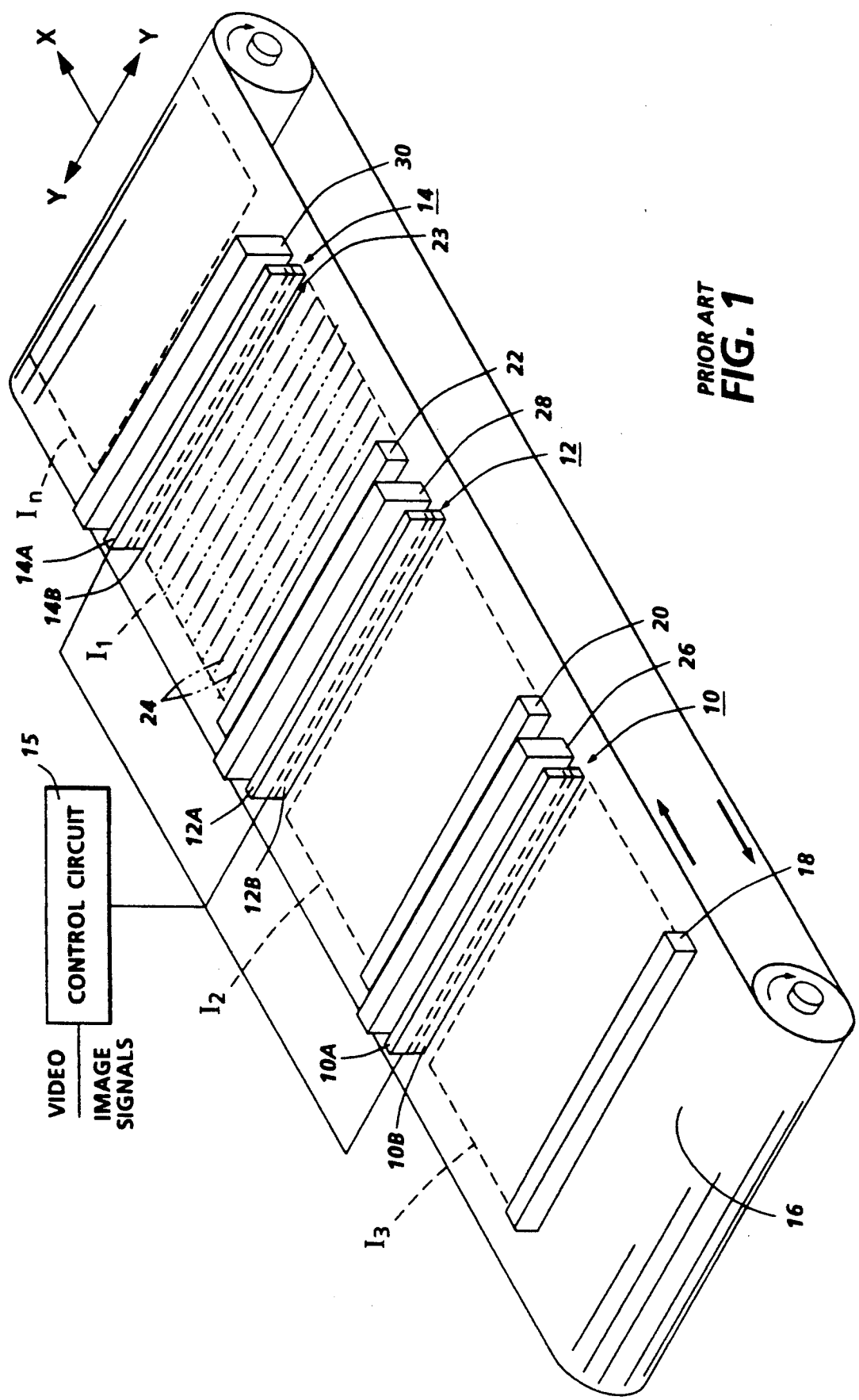
FIG. 1 shows a top perspective view of a prior art multi-print bar imaging system.
Figure 2:
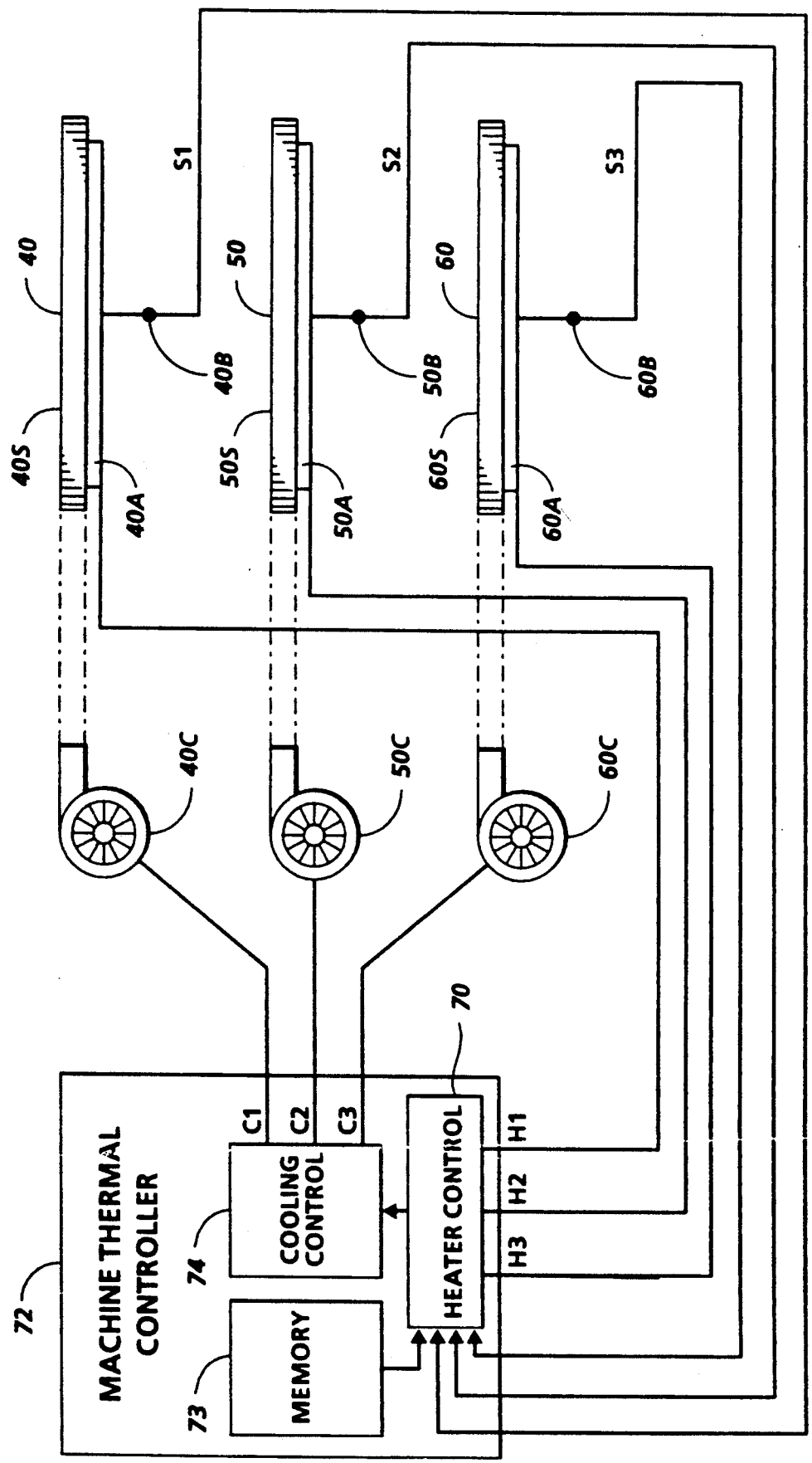
FIG. 2 shows a block diagram of the thermal control system, according to the present invention, that maintains multiple print bar temperatures within a specific required tolerance range.

According to the present invention, and referring to FIG. 2, LED print bars 40, 50, and 60 are shown. These print bars are shown as representative. A fewer or greater number of print bars may be required, depending on the particular configuration. For example, for a full color system, four print bars, one for each of the primary colors and one for black, may be required. The charge and development system shown in FIG. 1 would be modified accordingly. These print bars would be mounted, for example, in a printing system of the type shown in FIG. 1. For ease of description, the xerographic stations and the coupling lens array shown in FIG. 1 are omitted from this discussion, but it is understood that the print bars would be addressed and would expose the photoreceptor as is known in the art and as is shown in FIG. 1. Of particular interest for the present invention is how the print bars are modified so that their temperature can be controlled, in response to deviations in print bar to print bar temperatures. Each print bar has a resistive heating element (heater) 40A, 50A, 60A, connected respectively to the substrates 40S, 50S, 60S, of print bars 40, 50, 60, respectively. The heaters may extend along the length of the bar, as shown, or may assume other configurations consistent with usage.

The heater requirement is to raise an unused "cool" print bar close to the temperature of an active "hot" print bar. A heater power near the operating power of the "hot" print bar will generally be required. Each heater has an associated temperature sensor, 40B, 50B, 60B, which monitors the substrate temperature for each print bar and generates an appropriate signal, which represents the sensed temperature. The signal is sent to heater control circuit 70 in thermal controller 72. The sensors may be, for example, thermistors or junction devices.

Referring still to FIG. 2, cooling mechanisms 40C, 50C, 60C are positioned so as to direct a cooling medium against the edge of each print bar 40, 50, 60, respectively. The cooling medium is directed through cooling ducts (not shown). With the forced air system shown, it is preferable that air be taken from outside the machine environments, so that the temperature rise of the air, due to internal heating, is minimized. Alternate cooling systems that may be used are liquid cooling systems or Peltier cooling devices.

In operation, the print heads, with usage, experience individual temperature changes. A predetermined temperature differential between the print bars has been stored in controller 72 memory 73. As an example, it is assumed that the print bars must operate with no more than a 3.9° C. temperature gradient differential between the bars. Machine thermal control circuit 72 receives signals from sensors 40B, 50B, 60B, and continually monitors the input from the print bars during operation and compares the several temperatures with each other. Upon noting a deviation of more than 3.9° C. between at least two of the bars, either one or more cooling mechanisms or heaters are selectively activated. In a preferred embodiment, the cooling control system 74 is enabled to first attempt to cool the print bar which is identified as having the hotter relative temperature. For example, if print bar 40 temperature is sensed along line S1 at 36° C., and print bar 50 along line S2 at 34° C., and print bar 60 along line S3 at 30° C., comprarison circuitry in heater control circuit 70 recognizes that print bars 40 and 60 have a temperature differential greater than 3.9° C. A signal is sent to cooling control circuit 74 to generate a signal to energize cooling mechanism 40C along line C1. Upon detecting a drop in print bar 40 temperature to 35° C. (in heater control circuit 70), cooling mechanism 40C will be de-energized. If the print bar 40 does not respond quickly enough to the cooling, as detected by a timing mechanism initiated in controller 72 at the time of cooler mechanism 40C activation, the cooling mechanism 60C will be disabled, the control circuit 70 enabled, and heater 60A will be energized, raising the temperature of print bar 60. The heater power of heater 60A will cause the temperature of bar 60 to elevate, reducing the temperature differential between bar 40 and bar 60 to less than 3.9° C. The invention may be practiced with a combination of heating and cooling e.g. for the example given, print bar 40 may be cooled and print bar 60 may be heated to rapidly reduce the temperature differential between the two. The control circuit will be set to maintain as low an average absolute print bar temperature as possible, to optimize LED efficiency, while maintaining the temperature of each of the print bars within the necessary maximum differential temperature.

While the above description includes a specific example of a preselected temperature differential, it is understood that other differential ranges may be provided and other possibilities exist for maintaining differentials between two other print bars, or between all three print bars requiring cooling or heating combinations to provide both heating and cooling.

While the invention has been described with reference to the structures disclosed, it is not confined to the details set forth but is intended to cover such modifications or changes as they come within the scope of the following claims.

As one example, the heater shown in FIG. 2 may be modified so that areas adjacent the input cooling duct have a higher power density to compensate for the cooler air directed against that end and to compensate for conductive heat losses through the print bar mounts.

What is claimed is:

1. A method for controlling overall length of LED print bars including an individual heater attached to each of the print bars, each of the print bars having a characteristic operating temperature, by maintaining the print bars within a preselected temperature range with respect to each other, said method including the steps of:

sensing the operating temperature of each of the print bars and generating signals indicative thereof, detecting whether two or more of the print bars have operating temperatures which are greater than said preselected temperature range, and adjusting the temperature of one or more of the two or more print bars to restore the operating temperature to within the preselected temperature range.

2. In a color imaging recording apparatus for superimposing a plurality of images of different colors on one another to form a composite color image on a surface of a moving photoreceptor belt, said color image apparatus including:

a plurality of LED print bars, each of the bars having a characteristic operating temperature arranged adjacent to the photoreceptor belt surface, each of said print bars having a plurality of LEDS which are selectively energized to create an exposure pattern corresponding to one of said plurality of color images, a plurality of gradient index lens arrays, each of said arrays being associated with one of said print bars to transmit outputs of said one of said print bars to form said exposure pattern, and means for compensating for temperature induced variations in each said exposure pattern, so as to maintain precise registration of said color images, said means comprising means for selectively changing the operating temperature of one or more of the print bars, in response to detected temperature deviations, so as to maintain the operating temperatures of the print bars within a predetermined differential range of temperatures, with respect to one another.

3. In an imaging system wherein a plurality of light emitting print bars are selectively energized to expose a light sensitive surface and wherein each of said print bars reaches a characteristic temperature during operation, said characteristic temperature being different for each of said print bars thereby creating a temperature differential between each of said print bars, a thermal control system for maintaining the temperature of each of said print bars within a predetermined temperature differential including:

a plurality of heaters, each of said print bars including one of said heaters, means for selectively energizing each of said heaters to increase the temperature of the connected one of said print bars, a plurality of temperature sensors, each of said sensors associated with one of said print bars each of said sensors continually sensing the temperature of the associated one of said print bars and generating an output signal representative thereof, a plurality of cooling mechanisms, each of said cooling mechanisms being operatively coupled to one of said print bars to direct, when energized, a cooling medium to one end of the coupled one of said print bars so as to decrease the temperature of the coupled one of said print bars, and system control means for selectively controlling the temperature of each of said print bars, said temperatures represented by signals from the associated temperature sensor associated with each of said print bars by detecting said predetermined temperature differential between two or more of said print bars, and thereafter selectively energizing the heaters and cooling mechanisms to restore the temperature differential between each of said print bars to within the predetermined temperature differential.

4. The system of claim 3 wherein said system control means includes means for storing data associated with a predetermined maximum temperature differential between said print bars, said control means further including heater control means for controlling said heaters and cooling mechanisms by receiving said output signals from said temperature sensors and comparing each of the print bar temperatures with said maximum temperature differential between said print bars and, when sensing a temperature differential that exceeds said predetermined maximum temperature differential between said print bars, selectively energizing said heaters and said cooling mechanisms to restore said sensed temperature differential to within said predetermined temperature differential.

5. The system of claim 4 wherein each of said temperature sensors output signal is sent to the heater control means within the system control means, said heater control means controls said heaters and cooling mechanisms by sensing the sensed temperature differential greater than a differential previously stored in said data storing means, said stored differential being between two or more of said print bars, one of said print bars having a lower detected temperature than the another said print bars and enabling the heater associated with the one of said print bars having the lower detected temperature so as to increase the operating temperature of the heated one of said print bars to restore the sensed temperature differential to within the differential previously stored in the data storing means.

6. The system of claim 3 wherein each of the print bars is formed on a substrate having two ends, each of said heaters being connected to the substrate of one of said print bars and wherein each of said cooling mechanisms present the cooling medium to one of said two ends of said substrate of the coupled one of said print bars.

7. The system of claim 6 wherein each of said heaters has a power density gradient which provides greater heat to the one said two ends of the substrate having the cooling medium presented thereto.

* * * * *